United States Patent
Robinson et al.

(10) Patent No.: US 9,278,438 B2
(45) Date of Patent: Mar. 8, 2016

(54) ARCUATE TORQUE WRENCH STAND

(71) Applicant: Central States Plastic, LLC, Clarksburg, MO (US)

(72) Inventors: Gregory N. Robinson, Clarksburg, MO (US); Timothy R. McKnight, Columbia, MO (US)

(73) Assignee: CENTRAL STATES PLASTIC, LLC, Clarksburg, MO (US)

( * ) Notice: Subject to any disclaimer, the term of this patent is extended or adjusted under 35 U.S.C. 154(b) by 104 days.

(21) Appl. No.: 13/842,358

(22) Filed: Mar. 15, 2013

(65) Prior Publication Data
US 2013/0305888 A1 Nov. 21, 2013

Related U.S. Application Data

(60) Provisional application No. 61/648,813, filed on May 18, 2012.

(51) Int. Cl.
*B25B 23/00* (2006.01)
*B60B 29/00* (2006.01)

(52) U.S. Cl.
CPC .............. *B25B 23/00* (2013.01); *B60B 29/001* (2013.01); *B60B 29/007* (2013.01)

(58) Field of Classification Search
CPC .... B60B 29/00; B60B 29/001; B60B 29/007; B25B 23/00
USPC .............................. 81/462, 180.1, 466; 7/100
See application file for complete search history.

(56) References Cited

U.S. PATENT DOCUMENTS

| | | | |
|---|---|---|---|
| 634,100 A | 10/1899 | Wise | |
| 2,614,444 A | 10/1952 | Moore | |
| 3,262,341 A | 7/1966 | Cline et al. | |
| 3,298,665 A | 1/1967 | Sieloff | |
| 3,577,818 A | 5/1971 | Cramer | |
| 3,785,618 A * | 1/1974 | Medwick et al. | 254/94 |
| 3,831,468 A * | 8/1974 | Miller | 81/466 |
| 4,300,412 A * | 11/1981 | Houser et al. | 81/462 |
| 4,455,899 A * | 6/1984 | Savell | 81/466 |
| 4,553,456 A | 11/1985 | Rafert | |
| 4,619,161 A | 10/1986 | Reynolds | |
| 4,625,600 A | 12/1986 | Koren et al. | |
| 4,630,511 A | 12/1986 | Shirley | |
| 4,829,856 A * | 5/1989 | Reynolds | 81/462 |
| 5,431,074 A | 7/1995 | Durante | |
| 5,615,863 A | 4/1997 | Bailey | |
| 6,662,692 B2 | 12/2003 | Anderson et al. | |
| 7,121,175 B2 | 10/2006 | Anderson | |

* cited by examiner

*Primary Examiner* — Hadi Shakeri
(74) *Attorney, Agent, or Firm* — Bradley IP, LLC; Sean T. Bradley

(57) ABSTRACT

A torque wrench stand having an arcuate or curved surface for supporting the stand is described. The stand includes a generally semi-circular main body having a hub opening through which a torque wrench socket extension passes allowing the stand to be carried by the wrench from one wheel to the next. The hub is positioned off-set from the center of the stand along the straight upper edge of the stand. The stand supports the wrench via the extension held within the hub as the wheel lug nuts are removed. The stand pivots about the hub, thus allowing the arcuate surface of the stand to continuously adjust position as necessary so that the height of the hub from the ground matches the height of the selected lug nut from the ground and the stand easily adapts to the height of any lug nut.

12 Claims, 6 Drawing Sheets

ARCUATE TORQUE WRENCH STAND

CROSS REFERENCE TO RELATED APPLICATIONS

This application claims the benefit of the prior filed, provisional application Ser. No. 61/648,813, filed May 18, 2012.

BACKGROUND OF THE INVENTION

This invention relates generally to wheels for vehicles such as heavy duty trucks and trailers and, more particularly to a device for positioning and supporting a wrench and socket extension when engaged with a wheel lug nut.

Wrenches, such as torque wrenches, are known in the prior art. Torque wrenches allow a wheel lug nut, or wheel nut, to be tightened to a specified torque, which is required for safe operation and use of the wheel. Wheel nuts used to attached wheels to heavy duty vehicles typically require tightening to a much higher torque than conventional consumer vehicles, such as automobiles. To rotate wheel nuts to a high torque reading using manual equipment, such as a hand-operated torque wrench, it is often necessary to use a wrench with an extended or elongated handle, or to add a pipe or extension to the wrench, to achieve sufficient leverage. Because the wheel nuts are often set back considerably from the outer wall of the tire mounted on the wheel, a socket extension is often attached between the nut socket and the head of the wrench.

A wrench fitted with a socket extension and elongated handle or handle extension can be difficult to use without a stand to support the head of the wrench or the socket extension. It is usually necessary for the operator to be proximate the wheel to engage the socket with a wheel nut, yet the operator must then move distal from the wheel to grasp the distal end of the handle, which may be several feet away from the wheel. If the operator releases the head of the wrench and attached socket extension in order to move to the distal end of the handle, the wrench socket will often slip from the nut as the, typically, loose connection between the socket and nut is insufficient to support the weight of the socket, socket extension and wrench.

In the prior art, stands have been developed that can support the wrench, socket extension and socket, however, these stands either require moving the wheel to position each nut at a particular elevation relative to the stand before use, or inserting the socket extension in slot within the stand that most closely aligns with a given socket.

What is need is a device for supporting a wrench, socket extension and socket that is continuously adjustable in height relative to the ground so that the wrench may be readily positioned at an elevation that exactly matches that of a wheel nut and that also may be attached to the wrench so that the stand and wrench may be readily moved from nut to another as a unit.

BRIEF DESCRIPTION OF THE INVENTION

The purpose of this invention is to provide a support stand for tools such as large torque wrenches, particularly wheel lug nut wrenches. The stand includes a generally semi-circular main body having a hub opening positioned off-set from the center of the straight edge of the stand. The torque wrench includes an extension that passes through the hub opening so the stand may be carried by the wrench as a single tool to move together from one wheel to the next. The stand supports the wrench via the extension held within the hub as the wheel lug nuts are removed. Because the stand pivots about the hub, the arcuate surface of the stand allows for continuous adjustment of the wrench height to match the lug height from the surface of the ground.

An embodiment of the invention may comprise a tool stand including an upper side comprising a front segment and a back segment, a hub attached between the front segment and the back segment, the hub including a bore therethrough sized to receive a tool, and a lower, curved side curving upward at a front end to join the front segment and curving upward at a back end to join the back segment. The front segment and the back segment are of unequal lengths so that the hub is offset from the center of the stand and the curve of the curved side is asymmetrical. A substantially planar main wall is substantially enclosed by the front segment, back segment and curved side, which at least substantially define the perimeter of the stand. One or more reinforcement structures or stiffeners radiate or project out from the hub to contact the curved side, thereby joining the hub to the curved side to enhance the structural integrity and strength of the stand. In some embodiments, the reinforcement structures comprise portions of the main wall that are bent from the main plane of the main wall to create angles or bent portions of the main wall that enhance main wall rigidity. In some embodiments, the main wall includes one or more apertures that may be used as handholds, for providing means for viewing through the stand, or to reduce the overall weight of the stand by reducing stand material.

Another embodiment of the invention may comprise a torque wrench stand for at least partially supporting an extension member on a torque wrench when the torque wrench is engaged with a wheel lug nut. The stand may comprise a hub having a bore for receiving the extension member, the bore having a centrally disposed longitudinal axis. A curved side attaches, typically via other structures, to the hub. The curved side supports the stand upon a ground surface, the stand adjusting to a desired height by rotating the curved side around the longitudinal axis. As the stand is so-rotated, the curved side moves along the ground surface, and as the curved side so-moves the ground surface touches the curved side at different points of contact on the curved side and the hub is raised or lowered relative to the ground surface depending, principally, on the distance from the hub to a particular point of contact.

An embodiment of the invention comprises a wrench stand for supporting a wrench, such as a torque wrench. The stand comprises a hub having a bore for receiving a wrench socket or an extension member thereof. The hub is attached to an upper side that is relatively straight. The upper side is attached to a lower, curved side for supporting the stand upon a ground surface so that the ground surface touches the curved side at a point of contact on the curved side. The point of contact on the curved side changes and is different for different wheel lug nut elevations above the ground surface. The stand may include a reinforcing structure connecting the hub to the curved side such that the hub and curved side are in fixed relation to one another. In certain embodiments, the stand is formed of cooperating, interconnected male and female panels to form a single integral unit. In other embodiments, the stand is formed as one integral unit, such as via injection molding.

Other advantages of the invention will become apparent from the following description taken in connection with the accompanying drawings, wherein is set forth by way of illustration and example an embodiment of the present invention.

DETAILED DESCRIPTION

As required, a detailed embodiment of the present invention is disclosed herein; however, it is to be understood that the disclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
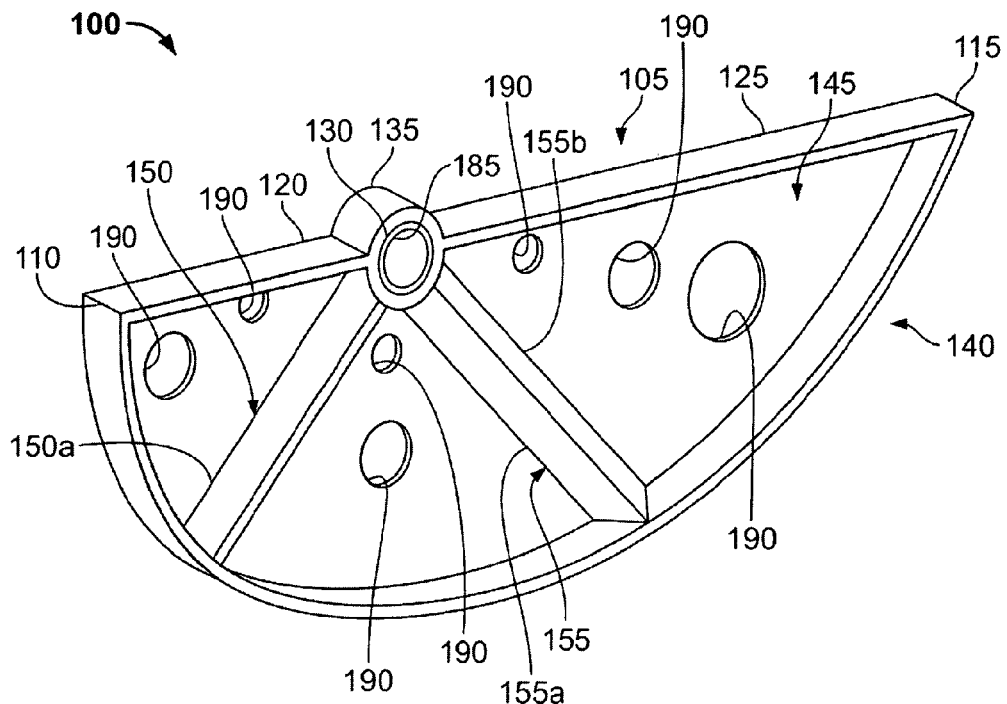
FIG. 1 is a front, top, left perspective view of an embodiment of a wheel nut wrench stand in accordance with the present invention.
Figure 2:
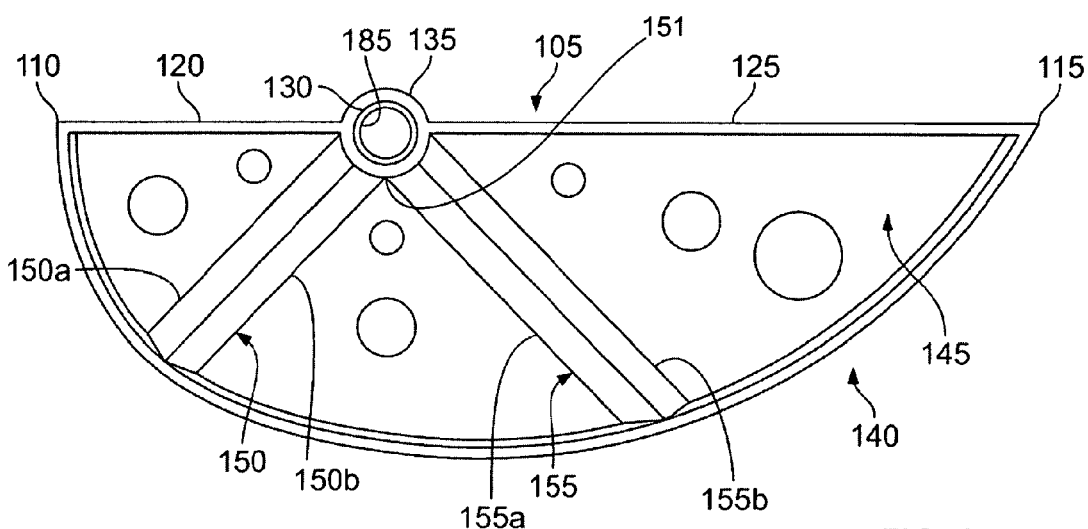
FIG. 2 is a front elevation view of the stand shown in FIG. 1.
Figure 3:
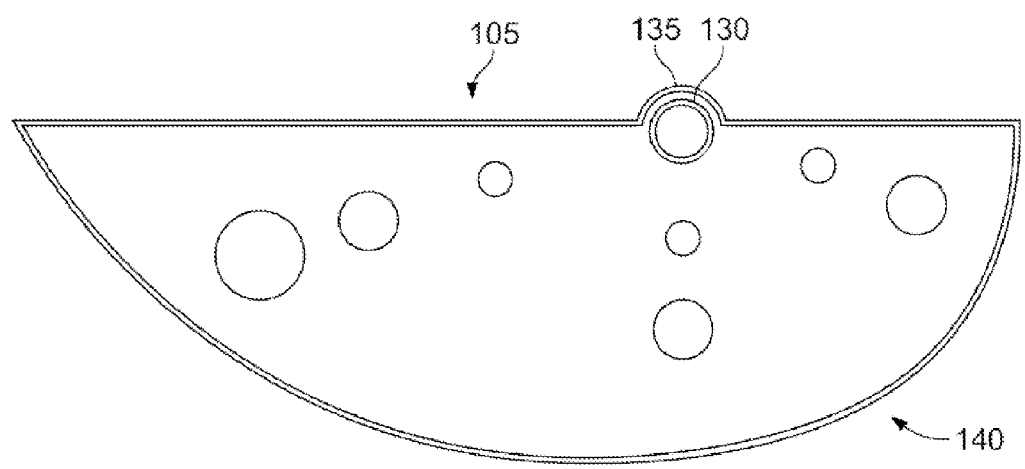
FIG. 3 is a rear elevation view of the stand shown in FIGS. 1 and 2.
Figure 4:
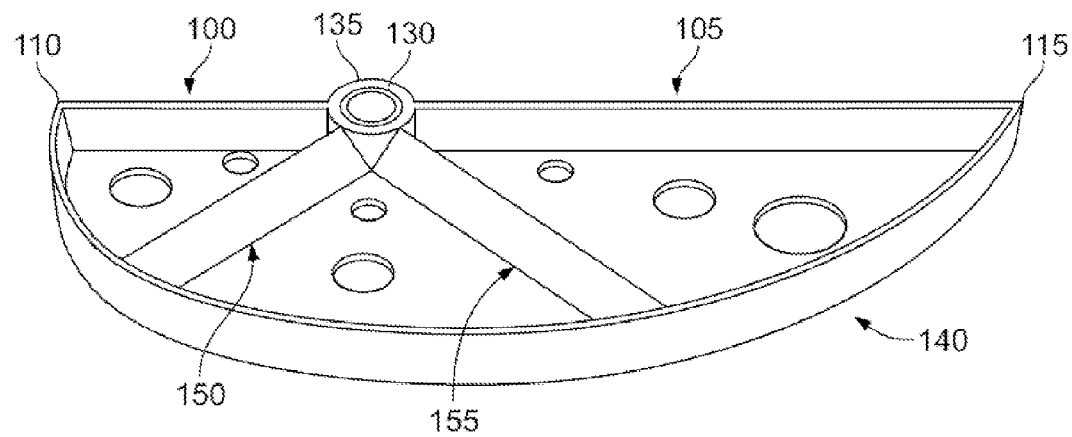
FIG. 4 is front, bottom perspective view of the stand shown in FIGS. 1-3.
Figure 5:
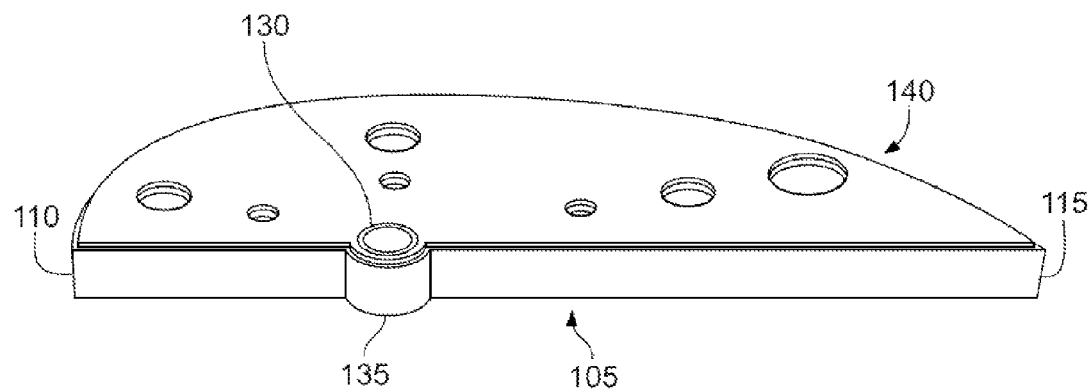
FIG. 5 is a rear, top perspective view of the stand shown in FIGS. 1-4.

With reference to the figures, FIGS. 1-12 illustrate embodiments of an arcuate or curvilinear wheel nut wrench stand 100 for supporting torque wrenches used to tighten wheel lug nuts. FIG. 1 is a front, top, left perspective view of an embodiment of a wrench stand 100 in accordance with the present invention. FIG. 2 is a front elevation view of the stand 100 shown in FIG. 1. The stand 100 includes a first, generally straight side 105 having a front end 110 and a back end 115. The first (upper) side 105 may comprise two segments, a front segment 120 and a back segment 125, that are divided by a hub or collar 130 that is located therebetween. The hub 130 typically joins the front segment 120 to the back segment 125. A curved segment 135 of the first side 105 joins the front segment 120 to the back segment 125 and may also form a portion of the housing that holds the collar 130. A second (lower), arcuate or curved side 140 extends from the front end 110 to the back end 115 and stands off from the collar 130. A generally planar, enclosed main wall 145 typically fills most of the space between, and is at least substantially enclosed by the first side 105 and second side 140.

The wall 145 may be traversed and divided by one or more reinforcement structures or stiffeners 150 and 155 that radiate outward from the hub 130 to contact the second side 140. The first stiffener 150 and second stiffener 155 may each comprise folds in the wall 145 that project outward from the plane of the wall 145. Each stiffener comprises two elongated subpanels (subpanels 150a and 150b forming stiffener 150, and subpanels 155a and 155b forming stiffener 155) that extend from the generally planar surface of the wall 145 to meet at an apex 151 and at an approximately 45 degree angle to one another. The stiffeners 150 and 155 serve to stiffen and increase the rigidity of the wall 145 and, consequently, the overall structure of the stand 100. Apertures 190 may be cut, drilled or otherwise formed in the wall 145 in order to reduce the amount of material comprising a stand 100 and thereby reduce the weight of the stand 100 with minimal compromise to the strength and rigidity of the stand 100 structure.

Figure 6:
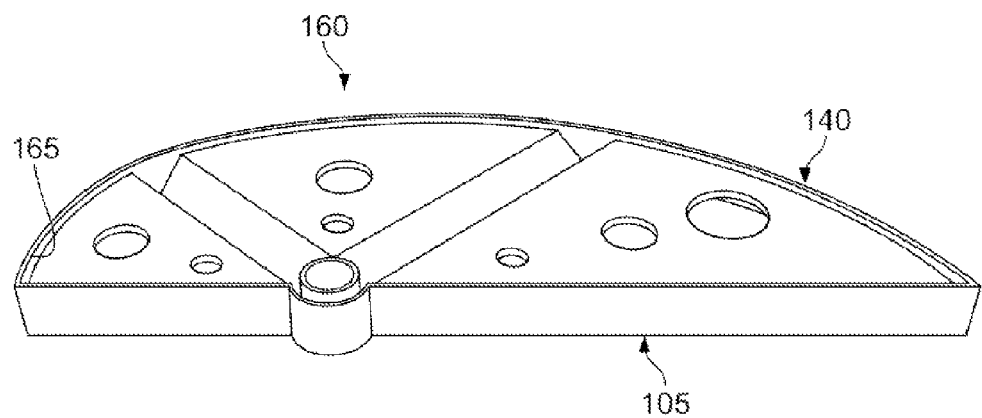
FIG. 6 is a perspective view of the female panel showing the inside surfaces of the female panel.
Figure 7:
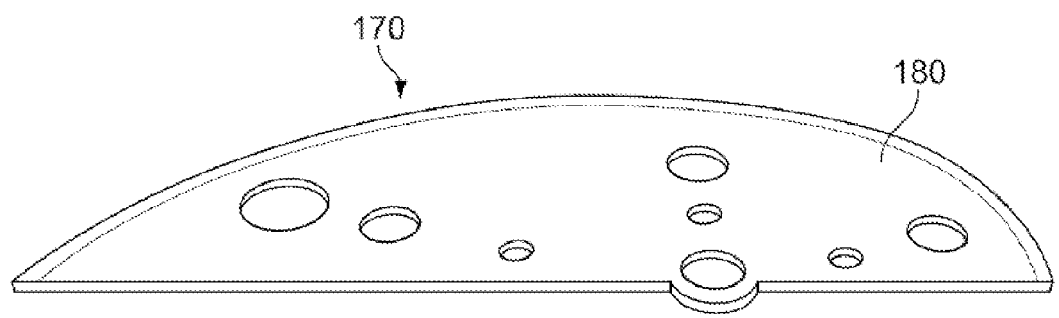
FIG. 7 is a perspective view of the male panel showing the inside surfaces of the male panel.

The stand 100 may be formed as an integral unit, such as by injection molding, but may also be formed from cooperating, interconnected panels. FIG. 6 illustrates a female panel 160 showing the inside surfaces thereof including a channel 165 formed inward of the first side 105 and second side 140 proximate the outer margins of the female panel 160. FIG. 7 illustrates a male panel 170 showing the inside surfaces thereof including a lip 175 that projects perpendicularly from the male panel wall 180 around the outer margins of the male panel 170. The lip 175 is sized to be received within the channel 165 when the male panel 170 is attached to the female panel 160 to form the stand 100. During assembly, the hub 130 is positioned within the female panel 160 and enclosed therein when the male panel 170 is aligned with the female panel 160 and the lip 175 is inserted into the channel 165 and fixed within using adhesive or other means.

Figure 8:
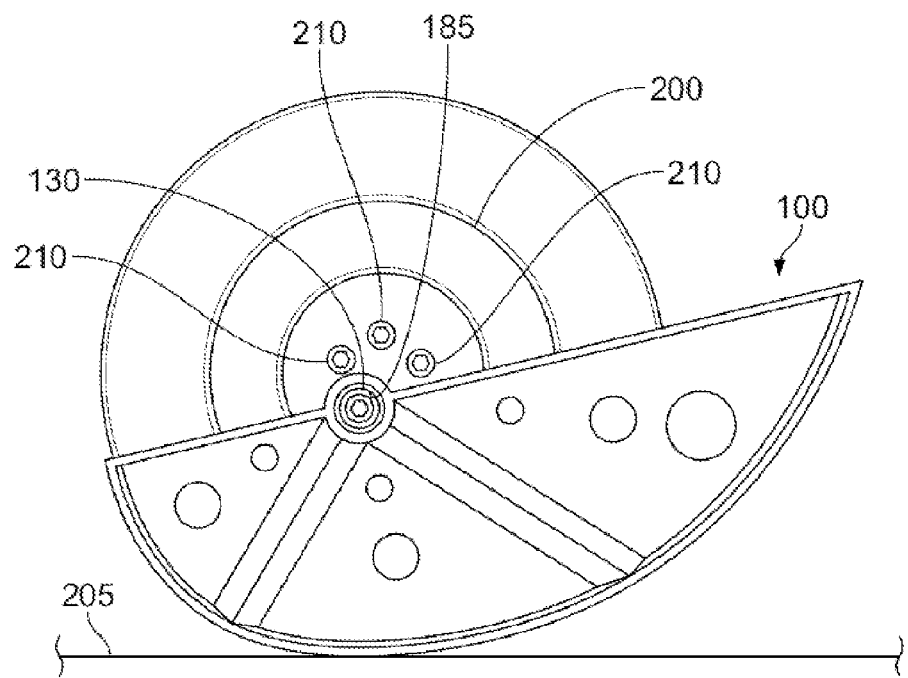
FIG. 8 is front elevation diagram of an embodiment of the a stand showing the stand positioned against a wheel with the arcuate bottom edge of the stand in contact with the ground and with the hub of the stand in alignment with a wheel nut.
Figure 9:
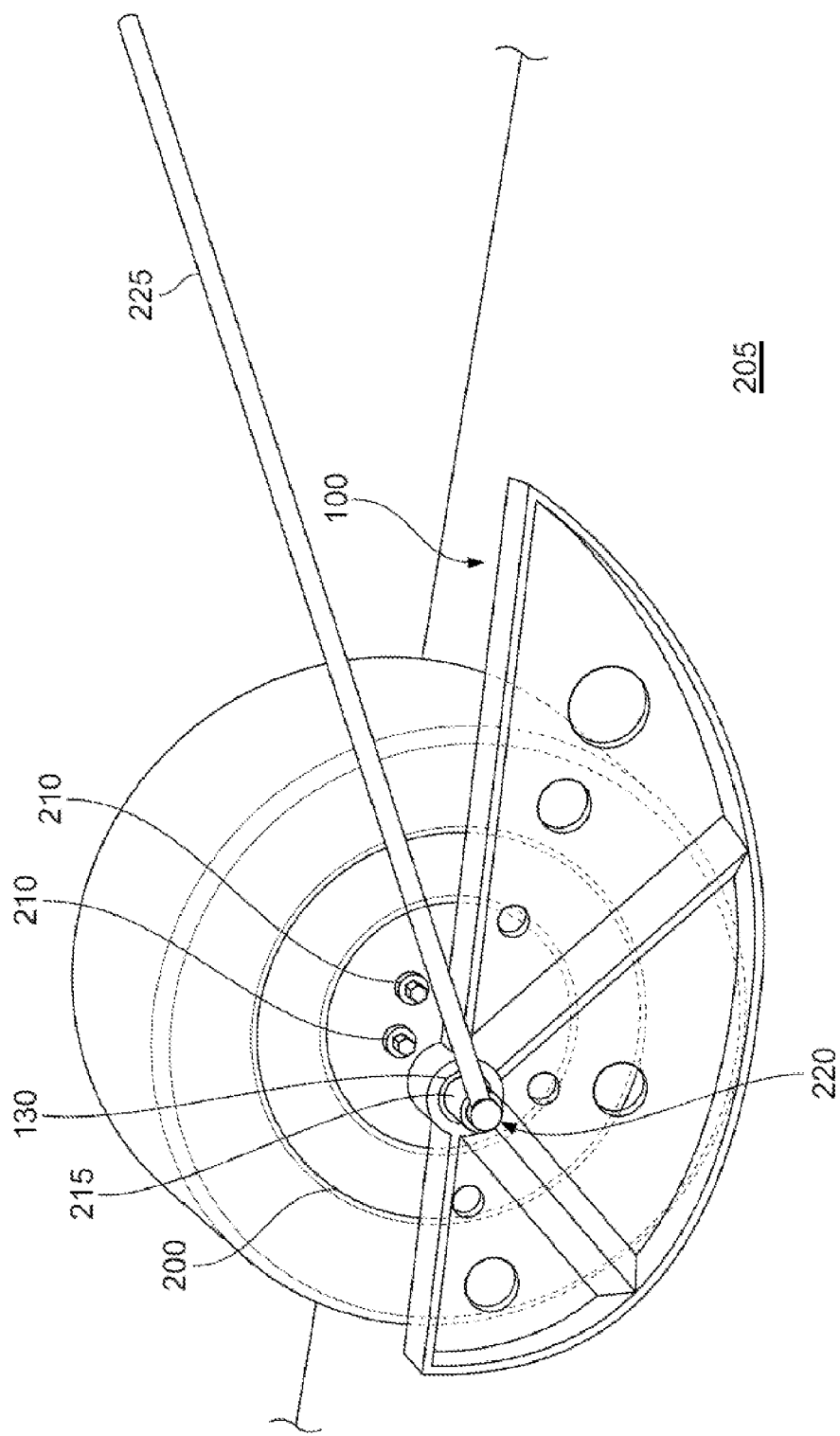
FIG. 9 is a front, top, right perspective view of an embodiment of a stand showing the stand positioned against a wheel with the arcuate bottom edge of the stand in contact with the ground and with a socket extension of a wrench held within the hub of the stand which is in alignment with a wheel nut.

FIG. 8 is front elevation diagram of an embodiment of the a stand 100 showing the stand 100 positioned against a wheel 200 with the arcuate bottom edge (second side 140) of the stand 100 in contact with the surface of the ground 205 (hereinafter "ground" or "ground surface") and with the aperture or bore 185 of the hub 130 in alignment with a wheel nut 210. FIG. 9 is a front, top, right perspective view of an embodiment of a stand 100 showing the stand 100 positioned against a wheel 200 with a socket extension 215 of a wrench 220 held within the bore 185 which is in alignment with a wheel nut 210 (not shown in this figure).

Figure 10:
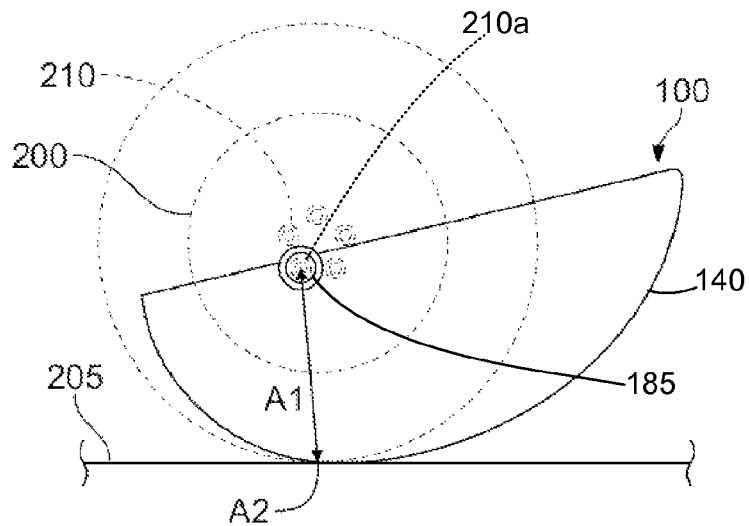
FIG. 10 is a front elevation diagram of an embodiment of a stand showing the stand positioned against a wheel with the arcuate bottom edge of the stand in contact with the ground and with the hub of the stand in alignment with a first wheel nut.
Figure 11:
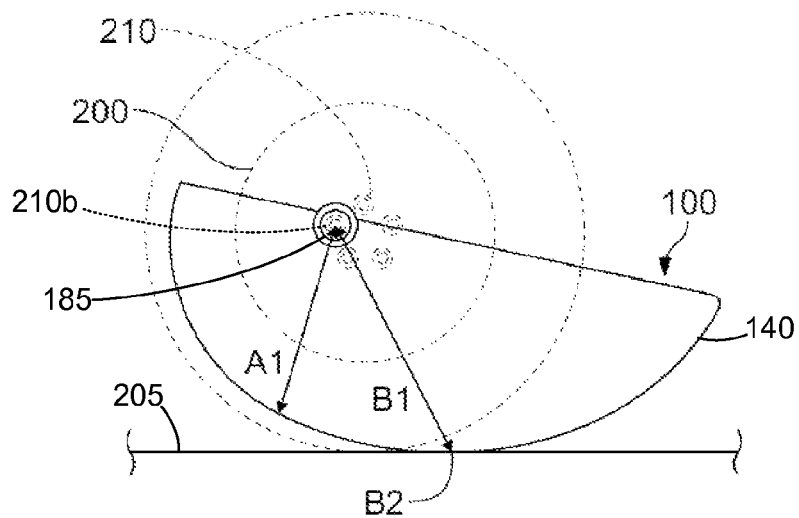
FIG. 11 is a front elevation diagram of an embodiment of a stand showing the stand positioned against a wheel with the arcuate bottom edge of the stand in contact with the ground and with the hub of the stand in alignment with a second wheel nut.
Figure 12:
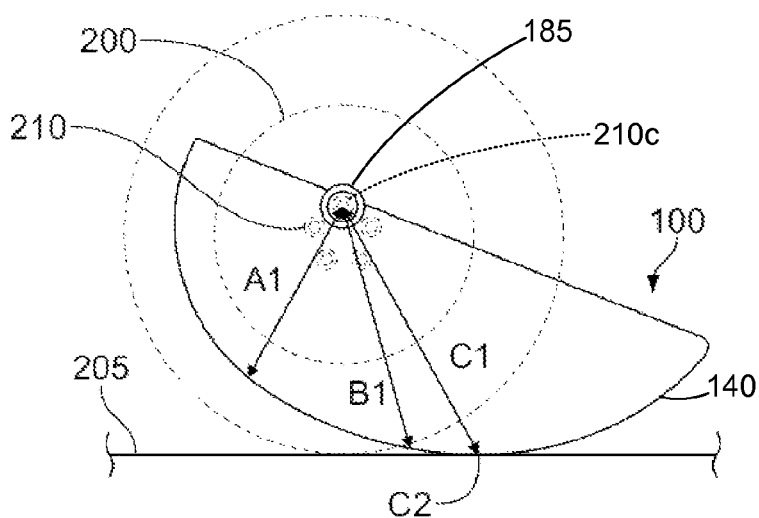
FIG. 12 is a front elevation diagram of an embodiment of a stand showing the stand positioned against a wheel with the arcuate bottom edge of the stand in contact with the ground and with the hub of the stand in alignment with a third wheel nut.

FIG. 10 is a front elevation diagram of an embodiment of a stand 100 showing the stand 100 positioned against a wheel 200 with the second side 140 in contact with the ground 205 and with the bore 185 in alignment with a first wheel nut 210a. Arrow A1 indicates the direction and distance from the center of the bore 185 (aligned with first wheel nut 210a) to first position A2 on the second side 140 where the stand 100 contacts the ground 205. FIG. 11 is a front elevation diagram of the stand 100 showing the bore 185 of the stand 100 in alignment with a second wheel nut 210b. Arrow B1 indicates the direction and distance from the center of the bore 185 (aligned with second wheel nut 210b) to second position B2 on the second side 140 where the stand 100 contacts the ground 205. FIG. 12 is a front elevation diagram of the stand 100 showing the bore 185 of the stand 100 in alignment with a third wheel nut 210c. Arrow C1 indicates the direction and distance from the center of the bore 185 (aligned with a wheel nut 210c) to third position C2 on the second side 140 where the stand 100 contacts the ground 205. As may be appreciated from the disclosure herein, as the stand 100 is moved from one wheel nut 210 to another, the curvature of the second side 140 allows the stand to continuously adjust to span the increasing or decreasing distance between a wheel nut 210 and the ground 205 by pivoting about the axis of the hub 130 or bore 185.

The curvature of the second (curved) side 140 may vary among embodiments of the stand 100, but in the disclosed embodiments the curvature generally widens or flattens as it progresses from the front end 110 to the back end 115. By way of example, in an embodiment of the stand 100 having an overall length from the front end 100 to the back end 115 of 42.75 inches, and a maximum depth (i.e. maximum width transverse to the longitudinal axis of the first side 105) from the first side 105 to the bottom or distal point of the second side 140 of 16.5 inches, the distances from the axis or center point of the bore 185 to points on the second side 140 may be as follows in accordance with an operational curvature of the second side 140.

| Degrees | Distance (inches) |
|---|---|
| 0 | 12.7 |
| −25 | 13.3 |
| −50 | 14.1 |
| −75 | 14.9 |
| −100 | 16.2 |
| −125 | 19.0 |
| −150 | 23.5 |
| −175 | 29.0 |
| −180 | 30.1 |
| −185 | 30.8 |

Degrees are measured with the first side 105 in horizontal disposition and from the center axis of the hub 130 or bore 185 to the second side 140. Measurements are taken at the specified degrees from horizontal along the curvature of the second side 140, starting at the front end 100 and progressing downward to the nadir of the curve and upward to the back end 115. It should be appreciated that embodiments of a stand 100 may be constructed having various overall dimensions and various curvatures of the second (curved) side 140.

In use, a stand 100 is placed against a wheel 200 so that the hub 130 and bore 185 are aligned with a selected wheel nut 210 and a torque wrench socket extension 215 is passed through the bore 185 until a socket (not shown but known in the prior art) attached to (or formed in) the distal end of the extension 215 engages the nut 210. If not already attached, the torque wrench 220 is attached to the proximate end of the extension 215. Because the stand 100 rotates around the extension 215 until the second side 140 contacts the ground 205, the stand 100 supports and holds the extension 215 (and thereby the attached socket and wrench 220) in place even after the user releases the stand 100 and wrench 220 to move to the distal end of the wrench handle 225. The lower, outer surface of the extension 215 typically rests against and upon and is supported by the lower, inner wall of the hub 130 (i.e. the lower or bottom portion of the wall that defines the bore 185).

With reference to FIG. 9, the user may then apply upward pressure to the handle 225 to twist or rotate the wrench 220 in a counterclockwise direction to loosen the engaged nut (not shown in FIG. 9 as the nut engaged with the wrench 220 is obscured by the structures of the wrench 220 and stand 100). The engaged nut may also be tightened by applying downward pressure to the handle 225 to rotate the handle clockwise. In this manner, and using the described apparatuses and methods, including the stand 100, a single operator may readily tighten and loosen wheel nuts 210 using a torque wrench 220 with an extended handle without assistance from a second operator.

What claimed is:

1. A wrench stand for supporting a wrench, comprising:
an upper generally straight side having a front segment and a back segment, a hub having a bore for receiving a wrench socket or an extension member thereof, said hub attached to said upper side between said segments to define said segments, said upper side attached to a lower, curved side for supporting said stand upon a ground surface, whereby said ground surface touches said curved side at a point of contact on said curved side, said point of contact being different for different wheel lug nut elevations above said ground surface.

2. The wrench stand of claim 1, further comprising a reinforcing structure connecting said hub to said curved side.

3. The wrench stand of claim 1, wherein said hub and said curved side are in fixed relation to one another.

4. The wrench stand of claim 1, wherein said point of contact changes in relation to changes in elevation of said hub above said surface.

5. The wrench stand of claim 1, wherein said stand is formed as a single integral unit.

6. A tool stand comprising:
an upper generally straight side comprising a front segment and a back segment,
a hub attached between said front segment and said back segment, said hub including a bore therethrough sized to receive a tool, and
a lower, curved side for supporting said stand upon a support surface, said curved side curving upward at a front end to join said front segment and curving upward at a back end to join said back segment.

7. The tool stand of claim 6 wherein front segment and said back segment are of unequal length.

8. The tool stand of claim 6 further comprising a generally planar wall substantially enclosed by said front segment, back segment and curved side.

9. The tool stand of claim 8 wherein said planar wall includes one or more reinforcement structures.

10. The tool stand of claim 8 wherein said planar wall includes one or more apertures.

11. The tool stand of claim 6 further comprising one or more reinforcement structures radiating out from said hub to contact said curved side.

12. A torque wrench stand for at least partially supporting an extension member on a torque wrench when the torque wrench is engaged with a wheel lug nut, said stand comprising:
an upper generally straight side having a front segment and a back segment,
a hub having a bore for receiving said extension member, said hub attached to said upper side defining said segments, said bore having a longitudinal axis; and
a curved side attached to said hub, said curved side for supporting said stand upon a surface, the stand adjusting to a desired height by rotating said curved side around said longitudinal axis, said surface touching said curved side at different points of contact on said curved side as said curved side is rotated.

* * * * *